Feb. 18, 1958     B. E. WILLIAMS     2,824,011
METHOD OF CLOTHING MEAT
Filed Sept. 13, 1955
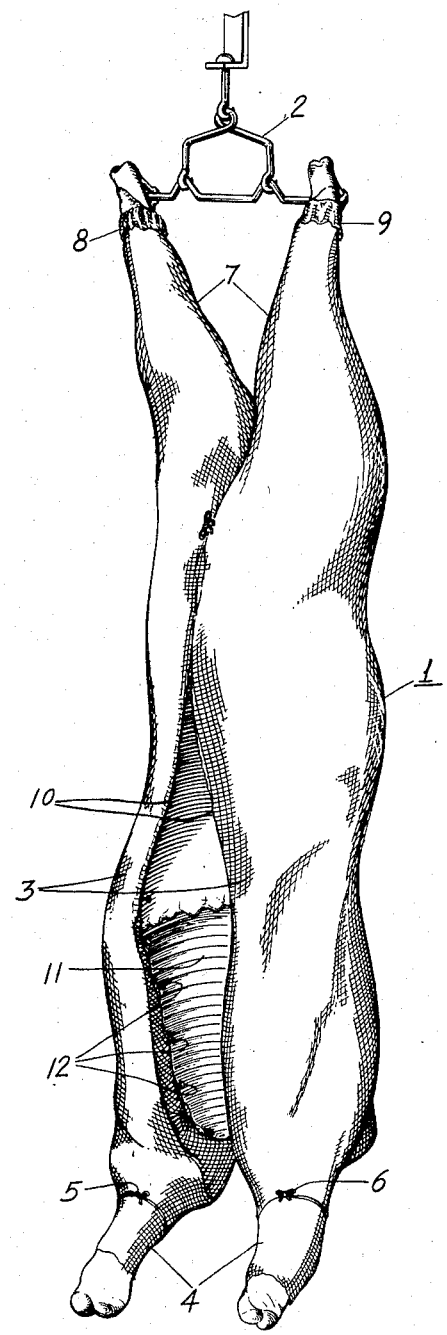
INVENTOR:
BEVERLY E. WILLIAMS
BY Howson & Howson
ATTYS.

United States Patent Office 2,824,011
Patented Feb. 18, 1958

2,824,011

METHOD OF CLOTHING MEAT

Beverly E. Williams, Hillsborough, Calif., assignor, by mesne assignments, to Hodges Research and Development Company, Incorporated, New York, N. Y., a corporation of California Application September 13, 1955, Serial No. 533,983

14 Claims. (Cl. 99—174)

The present invention relates to the clothing of edible animal carcasses; and, more particularly, it relates to the clothing of skinned beef, veal and lamb carcasses in a manner providing many important advantages over prior methods of clothing these meat products. The term "carcass" as used herein refers to the whole skinned and eviscerated edible animal body as well as to wholesale portions thereof, such as halves (sides), quarters, foresaddles and hindsaddles.

The usual treatment of beef, lamb and veal carcasses, following slaughtering and skinning, differs somewhat. Beef carcasses are customarily eviscerated and skinned on the killing floor, the skinned carcasses divided into sides and each side covered with a heavy cotton shroud cloth. The clothed carcasses are then transferred to a cooler in which a temperature of about 30-35° F. is maintained. Veal carcasses, on the other hand, are often chilled with the hide on, in order to provide the outside skinned surface with a better appearance and lighter color, since no heavy layer of fat is present on veal to protect the underlying meat. The surface of a skinned calf carcass, whether warm-skinned or cold-skinned, however, rapidly loses the bloom and appearance characteristic of freshly dressed, freshly-skinned carcasses. In preparing lamb for market (the term "lamb" being used herein to include all sheep carcasses regardless of age or sex of the animal) it is the usual practice to remove the pelt on or adjacent the killing floor. The skinned dressed carcasses are then placed in a cooler.

The conventional treatment of beef involves clothing the carcasses with a 5-20° salometer brine-soaked cotton cloth shroud. Warm-skinned veal is also generally clothed. The clothing of lamb has not been practiced to such a great extent as beef.

The cotton shroud cloth is used over and over again. For example, in the case of beef, once the carcass has cooled to about 30-35° F. in the cooler, the shroud cloth has served only part of its useful function of smoothing and bleaching the surface fat. The shroud, by the next day, has become dry, and unless promptly removed before the carcass has completely chilled and the fat "set up" will tend to adhere too tightly to the fat surface and cause tearing of the fat upon removal. As the cotton shroud rapidly dries out, the underlying fat surface of the beef becomes flaky. There are other limitations in connection with the use of a cotton shroud. For example, the bloom of the beef and bleaching of the fat surface is not as great as would be desired.

Once the shroud has been removed from the carcass, it must be laundered. Even laundering does not completely remove the blood, serums, juices and fat which are absorbed by the shroud, and these form a medium for the growth of bacteria which are often transferred to the next carcass to which the shroud is applied. Generally the shroud is reused after laundering before it has had an opportunity to dry. Hence, on the order of about four-fifths of the cotton shroud's life is spent in the wet condition. The cotton, because of residual natural oils and added starch sizing readily mildews in such moist condition and this and the constant reuse and relaundering of the cotton shrouds results in a rapid deterioration of the shrouds. This over years amounts to a substantial cost factor.

It is the principal object of the present invention to provide a novel method for clothing edible meat carcasses, such as beef, veal and lamb, which provides important advantages over means hitherto employed.

Another object of the present invention is to provide a novel means of clothing edible meat carcasses, such as beef, veal and lamb, whereby the shroud remains moist for a much longer period of time than does the conventional cotton shroud and may, therefore, be permitted to remain on the carcass for a much longer period of time than is the case with the conventional cotton shroud.

Still another object of the present invention is to provide a means of clothing edible meat carcasses whereby improved bloom and bleach of the meat and improved cleansing of blood spots, smears and bruises on the carcass are provided and wherein greater inhibition of the growth of bacteria upon the carcass is achieved.

A further object of the present invention is to provide a means for clothing edible meat carcasses wherein the shroud employed has a useful life many times longer than the conventional cotton shroud.

Other objects, including the provision of a novel edible meat carcass shroud, will become apparent from a consideration of the following specification and claims.

In accordance with the present invention, the edible meat carcass is covered with a moist woven cloth comprising at least a major proportion of ramie. In the preferred practice of the invention the shroud will comprise a major proportion of ramie and a minor proportion of another textile fiber such as cotton. All such shrouds will be referred to herein for simplicity as a "ramie shroud."

The present invention will be more readily understood from a consideration of the drawing in which Figure 1 is a perspective view of a meat carcass clothed with a ramie shroud in accordance with the present invention.

Ramie is one of the oldest textile-making fibers known to man, its principal use having been in the Orient and in the tropical and semi-tropical lands of the Far East where the plant can be grown and the plant and fiber processed by hand. The fiber comes from the ramie plant which requires decortication and degumming in order to provide the fiber in a condition for spinning into yarns and weaving into cloth. It has been found that a meat carcass shroud comprising a major proportion of ramie and its use in the clothing of edible meat carcasses provides many outstanding advantages over the use of the conventional cotton shroud. Such a ramie shroud is stronger when wet than dry, and since the shroud spends most of its active life in a wet condition this is an important factor. In addition, a shroud consisting largely of ramie is highly water-absorbent and will absorb and retain much more water than is the case with the cotton shroud. This means that the shroud will remain wet longer after application to the carcass and is still somewhat moist upon removal, and because of this it may be kept on the carcass for a much longer period of time. Furthermore, it has been found that meat carcasses clothed with a ramie shroud possess a much better appearance in that the meat has more bloom and the fat is more bleached, and substantially all of the fieriness, that is, the "high color" in the fat due to the blood absorbed thereby, is eliminated. Because the ramie shroud is much more absorbent than the cotton shrouds, more sodium chloride from the brine solution is absorbed and retained in the shroud without crystallizing out, and this makes for greater bleaching and also inhibition of bacteria. Further in this connection, it has been found that the ramie shroud is resistant to bacteria and mold and this is an important factor in meat carcass shrouds. Another important feature in connection with the use of the ramie shroud is the fact that no sizing is required for the spinning and weaving of the ramie. Cotton, on the other hand, is woven with sizing which remains in the shroud, at least to some extent, after each laundering, and this material contributes greatly as a breeding ground for mold and bacteria. In addition, it has been found that through constant reuse and re-laundering, the active life of a ramie shroud is many times that of a cotton shroud. In fact, it has been found that when subjected to the same use, a ramie shroud will outlast a cotton shroud by a factor of up to ten to one. It has also been noted that blood stains and serum stains are removed entirely from the ramie shroud upon laundering under which conditions similar stains are not completely removed from the conventional cotton shrouds. This accumulation of blood stains on the cotton shrouds contributes to the deterioration of the cotton shroud and to an eventual contamination of the meat surface.

The shroud of the present invention will comprise, as stated, at least a major proportion of ramie. In accordance with the broader aspects of the invention, the shroud may consist substantially entirely of ramie, that is the warp and the fill may consist essentially of yarns made up of ramie itself. However, there are certain advantages in a shroud comprising a blend of ramie and other textile fibers, either natural, such as cotton, or synthetic, like rayon, especially cotton, in which the ramie predominates. In such case the warp and fill yarns will themselves be a blend of ramie fibers and other textile fibers. In these blends, the ramie will make up at least 50%, by weight, of the mixture, and the proportion of ramie may go as high as about 95%. Typical ramie-cotton blends are 60:40, 70:30, 80:20 and 90:10, ramie to cotton. The preparation of the ramie shroud can be accomplished following generally conventional textile weaving operations, and woolen, worsted or cotton systems may be used, the above-described blend being particularly adapted to the cotton system.

The shroud, especially for use on beef, will be a generally rectangular woven cloth between about 72" and about 120" long and between about 36" and about 48" wide. The shroud will comprise a principal body portion and may contain a selvedge portion along at least one of the long edges. The principal body portion of the ramie shroud employed in accordance with the present invention will have a weave in which there are between about 20 and about 30 yarns in the warp and between about 20 and about 30 yarns in the fill, a shroud having 24 yarns in the warp and 24 yarns in the fill per inch being particularly advantageous. The yarn from which the fabric is woven may vary somewhat as to size, and may range between about 3000 and about 4000 yards of yarn per pound. A particularly suitable yarn count is one containing about 3200 yards per pound.

Selvedge edges along one or both long edges of the shroud may be provided. The selvedge may range in width from about 4" to about 6", and the selvedge will be a heavier weave than the main body of the shroud. In this connection, the selvedge may be such as will contain between about 40 and about 60 yarns in the warp and in the fill per inch. However, since the ramie cloth is much stronger than cotton, the necessity for a selvedge through which the shroud may be pinned or skewered to the carcass without tearing is much less critical, and the selvedge may be eliminated entirely thereby reducing the cost of the shroud and at the same time providing a uniform thickness of cloth to contact the entire carcass providing a more uniform appearance instead of a more bleached streak down the fat adjacent the chine bone as is the case with the conventional cotton shrouds with their heavy selvedge edges.

In clothing a meat carcass in accordance with the present invention, the ramie shroud will be wrapped around the skinned surfaces of the carcass as shown in the attached drawing.

In the drawing, the carcass 1 is shown suspended from conventional hooks 2. Ramie shroud 3 is shown wrapped snugly and smoothed about the skinned surfaces of the carcass, and tied or otherwise secured to forelegs 4 at 5 and 6, respectively, and to hindlegs 7 at 8 and 9, respectively. The shroud is also secured to the edges 10 of the visceral cavity 11 as by pins 12.

Before application of the shroud to the meat carcass, it will be moistened as by dipping in water, or preferably, as by dipping it in a brine solution or other solution of mold-inhibiting material. A brine solution of 5° to 20° salometer reading at 60° F. may be used or stronger salt solutions may be employed inasmuch as the ramie shroud will retain the moisture longer thereby permitting higher concentrations of salt without crystallizing out.

Once the shroud is applied to the carcass, the clothed carcass may be subjected to conventional treatment. However, since the shroud will remain moist longer than the conventional cotton shroud, it may be permitted to remain on the carcass for correspondingly greater lengths of time without danger of tearing or damaging the "fell" or fat surface, not only to completely fulfill its intended function of bleaching the fat surface and improving the bloom of the meat but also to protect the carcass.

Modification is possible in the nature, construction and weave of the ramie-containing cloth selected, permitting blends of cotton and other fibers, natural and synthetic with ramie as well as in the exact procedures and techniques employed in clothing carcasses therewith without departing from the scope of the present invention.

I claim:

1. The improvement in the treatment of edible skinned meat carcasses which comprises covering the skinned surface of the carcass with a woven cloth comprising at least a major proportion of ramie.

2. The improvement in the treatment of edible skinned meat carcasses which comprises covering the skinned surface of the carcass with a moist woven cloth comprising at least a major portion of ramie.

3. The treatment of edible skinned meat carcasses which comprises covering the skinned surface of the carcass with a woven cloth consisting substantially entirely of ramie.

4. The method of claim 3 wherein the cloth contains between about 20 and about 30 yarns, per inch, in the warp and between about 20 and about 30 yarns, per inch, in the fill.

5. The method of claim 4 wherein the cloth contains about 24 yarns, per inch, in the warp and about 24 yarns, per inch, in the fill.

6. The method of claim 4 wherein the yarns are of a size such that between about 3000 and about 4000 yards thereof weight a pound.

7. The method of claim 6 wherein the yarns are of a size such that about 3200 yards thereof weight a pound.

8. The treatment of edible skinned meat carcasses which comprises covering the skinned surface of the carcass with a woven cloth comprising a major proportion of ramie and a minor proportion of other textile fibers.

9. The method of claim 8 wherein said other textile fibers comprise cotton.

10. The method of claim 8 wherein the cloth contains between about 20 and about 30 yarns, per inch, in the warp, and between about 20 and about 30 yarns, per inch, in the fill.

11. The method of claim 10 wherein the cloth contains about 24 yarns, per inch, in the warp and about 24 yarns, per inch, in the fill.

12. The method of claim 10 wherein the yarns are of such size that between about 3000 and about 4000 yards thereof weigh a pound.

13. The treatment of edible skinned meat carcasses which comprises covering the skinned surface of the carcass with a brine-soaked cloth consisting substantially entirely of ramie.

14. The treatment of edible skinned meat carcasses which comprises covering the skinned surface of the carcass with a brine-soaked cloth comprising a major proportion of ramie and a minor proportion of other textile fiber.

References Cited in the file of this patent

UNITED STATES PATENTS

| | | |
|---|---|---|
| 2,371,967 | Lohner et al. | Mar. 26, 1945 |
| 2,564,454 | Stohlman | Aug. 14, 1951 |

FOREIGN PATENTS

| | | |
|---|---|---|
| 1,104,557 | France | June 15, 1955 |

OTHER REFERENCES

"The Textile Fibers," 1924, by J. M. Matthews, fourth edition, published by John Wiley & Sons, Inc., New York, page 785.